(12) United States Patent
Aoki et al.

(10) Patent No.: US 6,929,322 B2
(45) Date of Patent: Aug. 16, 2005

(54) VEHICLE SEAT AIR CONDITIONING SYSTEM

(75) Inventors: Shinji Aoki, Chiryu (JP); Toshifumi Kamiya, Takahama (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/703,384

(22) Filed: Nov. 7, 2003

(65) Prior Publication Data
US 2004/0198212 A1 Oct. 7, 2004

(30) Foreign Application Priority Data

Nov. 8, 2002 (JP) ........................................ 2002-325607
Jul. 10, 2003 (JP) ........................................ 2003-272817

(51) Int. Cl.[7] .............................................. A47C 7/72
(52) U.S. Cl. ......................... 297/180.14; 297/180.13; 297/452.57; 454/120
(58) Field of Search ................................ 454/120, 907; 297/180.12, 180.13, 180.14, 452.42, 454.46, 452.47

(56) References Cited

U.S. PATENT DOCUMENTS

| | | | | |
|---|---|---|---|---|
| 1,506,041 A | * | 8/1924 | Bassette et al. ............. | 392/380 |
| 2,755,016 A | * | 7/1956 | Busch ......................... | 417/362 |
| 4,183,557 A | * | 1/1980 | Hinden ........................ | 285/53 |
| 5,924,766 A | * | 7/1999 | Esaki et al. ............ | 297/180.13 |
| 6,003,950 A | * | 12/1999 | Larsson ................. | 297/452.42 |
| 6,059,018 A | * | 5/2000 | Yoshinori et al. ............. | 165/42 |

FOREIGN PATENT DOCUMENTS

| | | |
|---|---|---|
| JP | 2000-152849 | 6/2000 |
| JP | 2002-370517 | 12/2002 |

* cited by examiner

*Primary Examiner*—Harold Joyce
(74) *Attorney, Agent, or Firm*—Harness, Dickey & Pierce, PLC

(57) ABSTRACT

A buffering member is connected between a cushion member and an air discharge duct of a blower unit to damp vibrations of the blower unit and thus to limit conduction of the vibrations from the blower unit to the cushion member. Resilient damper members are held between a connector bracket and a cover member and hold seat spring members, so that the blower unit is supported by the seat spring member. The connector bracket includes protrusions, which protrude toward the cushion member and hold the seat spring members through the resilient damper members. The cushion member includes recesses, which receive the protrusions of the connector bracket in such a manner that the protrusions are spaced from the cushion member.

16 Claims, 12 Drawing Sheets

VEHICLE SEAT AIR CONDITIONING SYSTEM

CROSS REFERENCE TO RELATED APPLICATION

This application is based on and incorporates herein by reference Japanese Patent Application No. 2002-325607 filed on Nov. 8, 2002 and Japanese Patent Application No. 2003-272817 filed on Jul. 10, 2003.

BACKGROUND OF THE INVENTION

1. Field of the Invention

The present invention relates to a vehicle seat air conditioning system installed in a vehicle seat.

2. Description of Related Art

Various vehicle seat air conditioning systems have been proposed. For example, one vehicle seat air conditioning system is disclosed in Unexamined Japanese Patent Publication No. 2000-152849. In the disclosed seat air conditioning system, a blower unit is placed inside or outside a cushion member of a vehicle seat, and an air discharge duct of the blower unit is directly inserted into an air intake passage section formed in the cushion member.

In the disclosed seat air conditioning system, as described above, the air discharge duct is directly inserted into the air intake passage section of the cushion member. Thus, when the blower unit is driven to rotate, vibrations of the blower unit are likely conducted to the cushion member. The conduction of vibrations of the blower unit to the cushion member disadvantageously causes deterioration in comfortable seating of an occupant seated in the seat.

Another vehicle seat air conditioning system has been proposed in, for example, Japanese Unexamined Patent Publication No. 2002-370517. In this vehicle seat air conditioning system, a blower unit is mounted to seat spring members, each of which is made of a wire spring. The blower unit discharges conditioning air toward small air discharge openings of a surface cover member of a vehicle seat.

In this instance, the seat spring members are held between a casing of the blower unit and a separate connector bracket via felt components.

In the vehicle seat, a cushion member made of a urethane resin material is provided on a backside of the surface cover member, and the seat spring members are provided on a backside of the cushion member. Furthermore, the cushion member is resiliently supported by the seat spring members. Thus, the connector bracket is arranged between the cushion member and the seat spring members. In the above described Japanese Unexamined Patent Publication No. 2002-370517, the connector bracket is engaged with the cushion member.

When an occupant is seated in the seat, compressive force is applied to the cushion member by the weight of the occupant. Thus, the compressive force is also applied to the felt components, which are provided around the seat spring members, through the cushion member, so that the spring constant of each felt component is increased. Therefore, the vibration damping performance of each felt component is reduced. Therefore, vibrations, which are induced by operation of the blower unit, are conducted to the occupant through the cushion member, causing uncomfortable feeling of the occupant.

SUMMARY OF THE INVENTION

The present invention addresses the above disadvantages. Thus, it is an objective of the present invention to effectively limit conduction of vibrations, which are induced by operation of a blower unit, to a vehicle seat side.

To achieve the objective of the present invention, there is provided a vehicle seat air conditioning system that includes a cushion member, a blower unit and a buffering member. The cushion member provides cushioning to an occupant seated on the cushion member and includes an air passage arrangement that extends in the cushion member. The air passage arrangement includes an air intake passage section at an inlet of the air passage arrangement. The blower unit is arranged outside the cushion member to blow air and includes an air discharge duct at an air outlet of the blower unit. The air discharge duct is connected to the air intake passage section of the cushion member to supply blown air from the blower unit to the air intake passage section. The buffering member is connected between the cushion member and the air discharge duct to damp vibrations of the blower unit and thus to limit conduction of the vibrations from the blower unit to the cushion member.

The vehicle seat air conditioning system can further include a surface cover member, at least one seat spring member, a connector bracket, a blower unit side securing member and at least one resilient damper member. The surface cover member includes a plurality of air discharge openings communicated with the air passage arrangement and is arranged on one side of the cushion member, which is opposite from the blower unit. The at least one seat spring member is arranged between the cushion member and the blower unit and resiliently supports the cushion member. The connector bracket is positioned between the cushion member and the at least one seat spring member and is secured to the blower unit. The blower unit side securing member is secured to the blower unit. The at least one resilient damper member is held between the connector bracket and the blower unit side securing member and holds the at least one seat spring member, so that the blower unit is resiliently supported by the at least one seat spring member through the at least one resilient damper member. The connector bracket includes at least one protrusion, which protrudes toward the cushion member and holds the at least one seat spring member through the at least one resilient damper member. The cushion member includes at least one recess, which receives the at least one protrusion of the connector bracket in such a manner that the at least one protrusion is spaced from the cushion member.

Alternatively or in addition, in the above arrangement, it is possible to arrange the at least one resilient damper member in such a manner that every connection between the blower unit and the at least one seat spring member is provided with at least one of the at least one resilient damper member in such a manner that the resilient damper member is inserted in the connection to damp vibrations transmitted from the blower unit to the at least one seat spring member.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION (First Embodiment)

Figure 1:
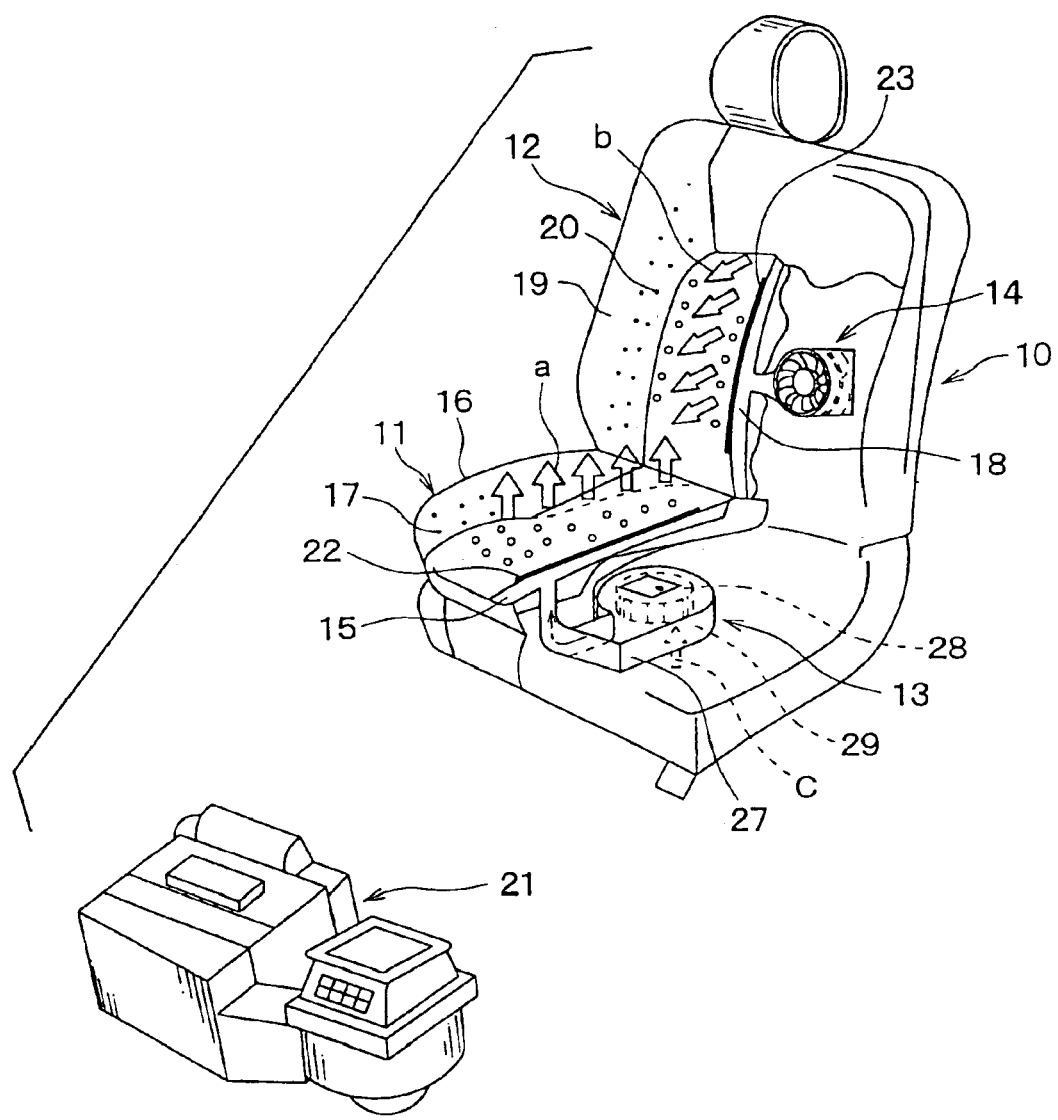
FIG. 1 is a perspective view of a vehicle seat air conditioning system according to a first embodiment of the present invention.

FIG. 1 shows a vehicle seat 10, which has a vehicle seat air conditioning system according to a first embodiment of the present invention. The vehicle seat 10 shown in FIG. 1 is practically used as a driver seat or front-passenger seat of a vehicle.

The vehicle seat 10 includes a seat cushion arrangement 11 and a seat back arrangement 12. The seat cushion arrangement 11 supports buttocks of an occupant (not shown) in the seat 10, and the seat back arrangement 12 supports a back of the occupant. First and second blower units 13, 14 are arranged in the seat cushion arrangement 11 and the seat back arrangement 12, respectively.

The first blower unit 13 draws air from a vehicle passenger compartment through a circular air intake opening 29 (FIG. 3) of the first blower unit 13 located at a lower side of the seat cushion arrangement 11. The air drawn from the air intake opening 29 is then conducted to a surface cover member 16 of the seat cushion arrangement 11 through an air passage arrangement 15 provided in the seat cushion arrangement 11. Then, as indicated by arrows "a" in FIG. 1, the drawn air is discharged toward the body of the occupant through a plurality of air discharge openings 17, which penetrate through the surface cover member 16.

The second blower unit 14 blows air in a manner similar to that of the first blower unit 13. That is, the second blower unit 14 draws air from the vehicle passenger compartment through an air intake opening (not shown) of the second blower unit 14 located at a lower side of the seat back arrangement 12. The air drawn from the air intake opening of the second blower unit 14 is then conducted to a surface cover member 19 of the seat back arrangement 12 through an air passage arrangement 18 provided in the seat back arrangement 12. Then, as indicated by arrows "b" in FIG. 1, the drawn air is discharged toward the body of the occupant through a plurality of air discharge openings 20, which penetrate through the surface cover member 19.

A passenger compartment air conditioning unit 21 is arranged inside a front instrument panel (not shown) of the vehicle, and the passenger compartment is air conditioned by the conditioning air discharged from the passenger compartment air conditioning unit 21. Thus, the first and second blower units 13, 14 can blow the conditioned air of the passenger compartment toward the surface cover members 16, 19.

In each of the seat cushion arrangement 11 and the seat back arrangement 12, an electric heater 22, 23 is provided on a backside of the surface cover member 16, 19. Each electric heater 22, 23 is made of an electric resistance wire, which is bent into a meander shape and extends through a wide area of a contact surface of the surface cover member 16, 19, which contacts the occupant. Thus, when the electric heater 22, 23 is energized at the time of heating operation in the winter, warm air heated by the electric heater 22, 23 is discharged through the air discharge openings 17, 20 of the surface cover member 16, 19.

Next, a specific structure of the first blower unit 13 of the seat cushion arrangement 11 will be described with reference to FIGS. 2 to 7.

Figure 2:
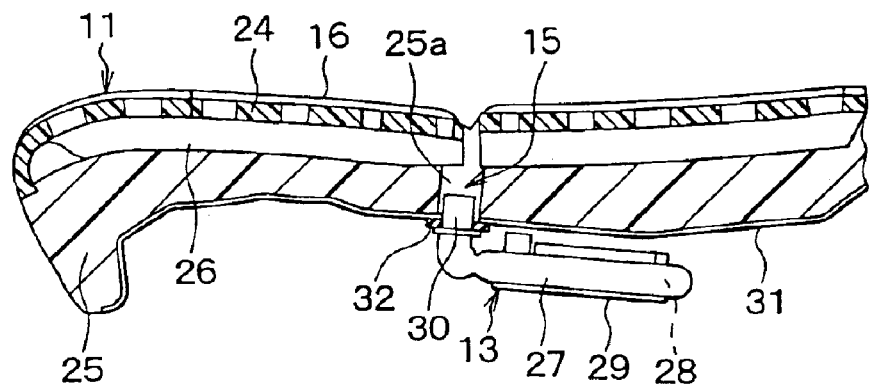
FIG. 2 is a schematic partial cross sectional view showing a blower unit of the vehicle seat air conditioning system of the first embodiment.

As shown in FIG. 2, the seat cushion arrangement 11 includes a top pad arrangement 24 and a cushion member 25. The top pad arrangement 24 and the cushion member 25 are provided on a backside (lower side) of the surface cover member 16 and are arranged one after the other in the vertical direction. A thickness (e.g., 40 mm) of the cushion member 25 is greater than a thickness of a cover pad arrangement (not shown) and a thickness of the top pad arrangement 24 and is sufficient to provide comfortable cushioning. The cover pad arrangement is arranged between the surface cover member 16 and the top pad arrangement 24.

A portion of the air passage arrangement 15 extends on a surface cover member 16 side of the cushion member 25. The air passage arrangement 15 includes a plurality of air distributing grooves 26, which conduct air to the air discharge openings 17 of the surface cover member 16. It should be noted that an air permeable member (e.g., a meshed body) can be used in place of the air distributing grooves 26 to conduct air to the air discharge openings 17 of the surface cover member 16.

As shown in FIG. 1, a blower casing 27 of the first blower unit 13 forms a scroll casing, which defines a scroll passage therein. A centrifugal blower fan 28 is rotatably received in the blower casing 27.

When the centrifugal blower fan 28 is rotated by a drive motor (not shown), air near a floor of the passenger compartment is drawn into the blower casing 27 through the air intake opening 29 provided in the blower casing 27, as indicated by an arrow C in FIG. 1. In the blower casing 27, the drawn air flows through the scroll passage toward a radially outer part of the blower casing 27 and is discharged from an air discharge duct 30 of the blower casing 27 into a through hole 25a of the air passage arrangement 15, as shown in FIG. 2.

The first blower unit 13 is placed below the cushion member 25 and is supported by seat spring members 31, each of which is made of a wire, in such a manner that the entire first blower unit 13 is suspended by the seat spring members 31. More specifically, the first blower unit 13 is suspended on a lower side of the seat spring members 31, which is opposite from the cushion member 25.

Next, a connection between the through hole 25a of the cushion member 25 and the air discharge duct 30 of the blower casing 27 will be described with reference to FIGS. 2 and 3. The through hole 25a extends through the cushion member 25 in a thickness direction of the cushion member 25 (i.e., in the vertical direction of the vehicle). The through hole 25a constitutes an air intake passage section of the present invention provided in the inlet of the air passage arrangement 15. Furthermore, the through hole 25a is centered in the cushion member 25 in the left-right direction of the vehicle and is closer to the front end of the cushion member 25 than the rear end of the cushion member 25 in fore-aft direction of the vehicle. Alternative to the through hole 25a, a blind hole communicated with the air distributing grooves 26 can be used as the air intake passage section of the present invention.

Figure 3:
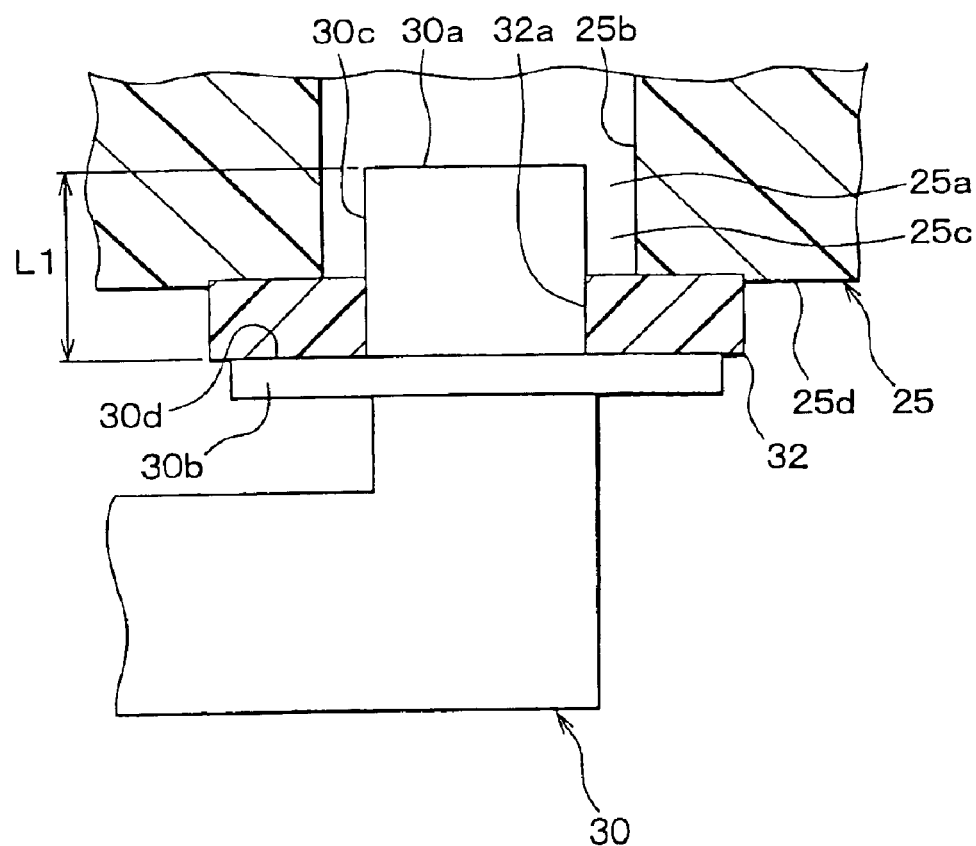
FIG. 3 is an enlarged partial cross sectional view showing a connection between an air discharge duct of the blower unit and a hole of a cushion member according to the first embodiment.

As shown in FIG. 3, the discharge duct 30 of the blower casing 27 connected to the through hole 25a includes a support portion 30b, which is formed as an annular flange. The support portion 30b is located in a position, which is axially spaced a predetermined distance L1 from a distal end surface 30a of the discharge duct 30. Furthermore, a space 25c is provided between an inner peripheral surface (also referred to as an inner peripheral surface of a passage wall) 25b of the through hole 25a and a distal end outer peripheral surface 30c of the discharge duct 30, which is located between the distal end surface 30a of the discharge duct 30 and an end surface 30d of the support portion 30b provided on a cushion member 25 side of the support portion 30b.

A buffering member 32 is provided to an end surface 25d of the cushion member 25, which is located on a first blower unit 13 side of the cushion member 25, to close the through hole 25a. In other words, the buffering member 32 is provided between the support portion 30b of the discharge duct 30 and a lower inner peripheral edge of the passage wall of the through hole 25a. The buffering member 32 is formed into a generally cylindrical body, which has an inner peripheral surface 32a and a predetermined thickness, i.e., an axial length. An outer diameter of the buffering member 32 is greater than an inner diameter of the through hole 25a. Furthermore, an inner diameter of the buffering member 32 is substantially the same as an outer diameter of the distal end of the discharge duct 30 where the distal end outer peripheral surface 30c is located. Thus, the inner peripheral surface 32a of the buffering member 32 coincides with the distal end outer peripheral surface 30c of the discharge duct 30.

The buffering member 32 has relatively low air permeability for the air blown by the first blower unit 13. Here, the relatively low air permeability means that even when portion of the air blown by the first blower unit 13 penetrates radially outwardly through the buffering member 32 to the atmosphere, it will not substantially affect the air blowing performance of the first blower unit 13, and the relatively low air permeability should includes zero air permeability that completely prevents penetration of the air through the buffering member 32 to the atmosphere.

The discharge duct 30 is installed to the through hole 25a of the cushion member 25 as follows. That is, the outer peripheral surface 30c of the discharge duct 30 is fitted to the inner peripheral surface 32a of the buffering member 32 to clamp the buffering member 32 between the end surface 25d of the cushion member 25 and the end surface 30d of the support portion 30b. Thus, the support portion 30b of the discharge duct 30 holds the buffering member 32.

A preferred material of the buffering member 32 is polyether urethane foam or polyester urethane foam, which limits vibrations of the blower casing 27 and prevents permeation of the air, which is blown by the centrifugal blower fan 28, through the buffering member 32.

It should be noted that the buffering member 32 can be air tightly bonded to the cushion member 25 by adhesive (not shown). Furthermore, the buffering member 32 can be air tightly bonded to the support portion 30b by adhesive (not shown).

Advantages of the first embodiment will be described.

(1) The first blower unit 13 is supported by the seat spring members 31 in such a manner that the entire first blower unit 13 is suspended by the seat spring members 31 below the cushion member 25. The buffering member 32, which limits conduction of vibrations of the first blower unit 13 to the cushion member 25, is provided between the discharge duct 30 and the through hole 25a. Thus, conduction of vibrations of the first blower unit 13 to the cushion member 25 is reduced or limited. Therefore, the occupant can seat comfortably on the cushion member 25. Furthermore, conduction of vibrations from the cushion member 25 to the first blower unit 13 is also reduced or limited. Thus, occurrence of resonation of vibrations of the first blower unit 13 and vibrations of the cushion member 25 can be reduced or limited.

(2) The space 25c is provided between the outer peripheral surface 30c of the discharge duct 30 and the inner peripheral surface 25b of the through hole 25a. Thus, even when the first blower unit 13 is vibrated, the outer peripheral surface 30c of the discharge duct 30 of the first blower unit 13 is less likely to contact with the inner peripheral surface 25b of the through hole 25a. As a result, it is possible to reduce conduction of vibrations of the first blower unit 13 to the cushion member 25 in comparison to a case where the space 25c is eliminated between the outer peripheral surface 30c of the discharge duct 30 and the inner peripheral surface 25b of the through hole 25a.

(3) The buffering member 32 has the relatively low air permeability. Thus, the air blown by the first blower unit 13 less likely leaks between the discharge duct 30 and the passage wall of the through hole 25a.

(4) When the buffering member 32 is adhered to at least one of the cushion member 25 and the discharge duct 30, the air thigh connection can be formed therebetween, and assembly of these components can be eased.

(Second Embodiment)

Figure 4:
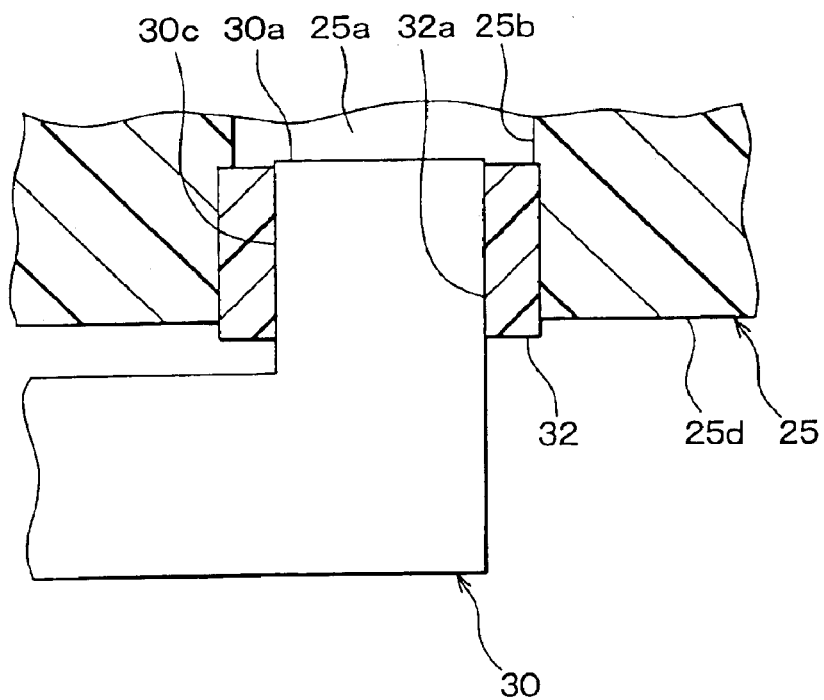
FIG. 4 is an enlarged cross sectional view showing a connection between an air discharge duct of a blower unit and a hole of a cushion member according to a second embodiment of the present invention.

In the first embodiment, the buffering member 32 is provided to the end surface 25d of the cushion member 25, which is located on the first blower unit 13 side of the cushion member 25. In a second embodiment, as shown in FIG. 4, a cylindrical buffering member 32 is provided to the inner peripheral surface 25b of the through hole 25a. More specifically, the cylindrical buffering member 32 is radially positioned and is clamped between the distal end outer peripheral surface 30c of the discharge duct 30 and the inner peripheral surface 25b of the through hole 25a.

Here, the buffering member 32 can be air tightly adhered to the inner peripheral surface 25b of the through hole 25a by adhesive (not shown). Also, the buffering member 32 can be air tightly adhered to the outer peripheral surface 30c of the discharge duct 30 by adhesive (not shown).

(Third Embodiment)

In the first and second embodiments, the buffering member 32 is used to restrain conduction of vibrations from the first blower unit 13 to the cushion member 25. In a third embodiment, as shown in FIG. 5, a damping flange (serving as a buffering member) 25e, which has an annular shape and projects radially inward in the through hole 25a is used in place of the buffering member 32 discussed in the first or second embodiment.

Figure 5:
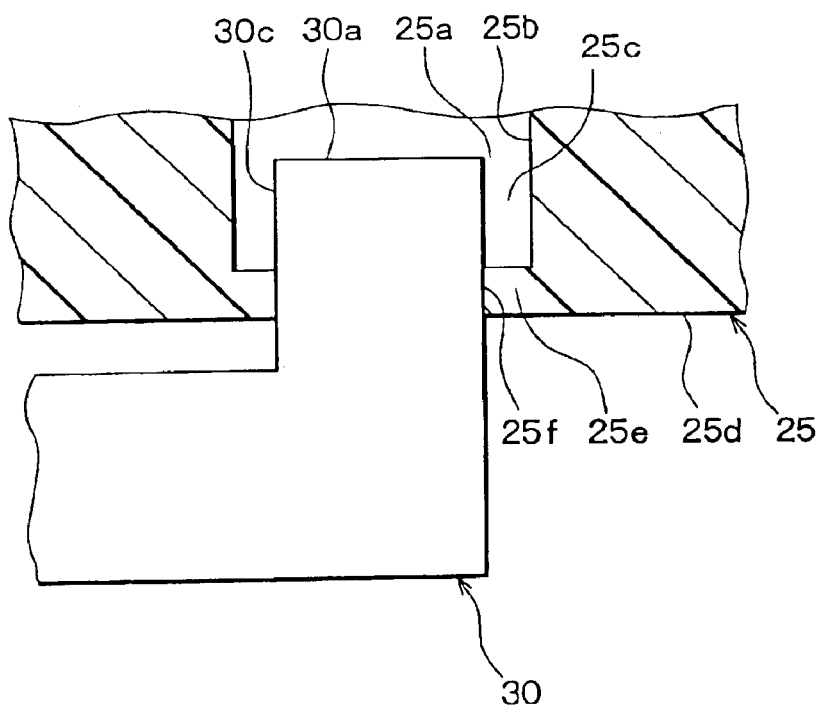
FIG. 5 is an enlarged cross sectional view showing a connection between an air discharge duct of a blower unit and a hole of a cushion member according to a third embodiment of the present invention.

The damping flange 25e is formed integrally with the cushion member 25 and has a central through hole 25f in its center and a predetermined thickness, i.e., a vertical length in FIG. 5. The distal end outer peripheral surface 30c of the duct 30 is directly inserted into the central through hole 25f of the damping flange 25e.

The damping flange 25e does not necessarily mean the flange 25e that has the through hole 25f with a circular cross section but can be a flange that has a central through hole with an elliptic cross section, an oblong cross section or a rectangular cross section, which corresponds to a shape of the distal end of the discharge duct 30.

Figure 6:
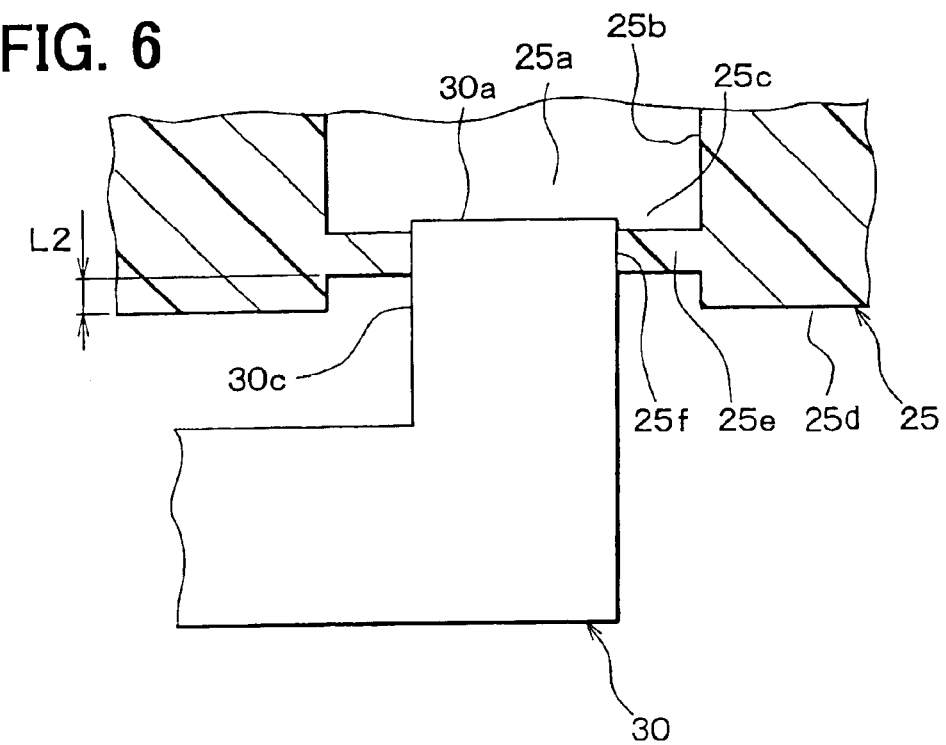
FIG. 6 is an enlarged cross sectional view showing a modification of the connection between the air discharge duct of the blower unit and the hole of the cushion member according to the third embodiment.

Alternatively, as shown in FIG. 6, in the through hole 25a of the cushion member 25, the damping flange 25e can be formed at a position that is spaced a predetermined distance or depth L2 from the end surface 25d of the cushion member 25, which is located on the first blower unit 13 side of the cushion member 25.

Figure 7:
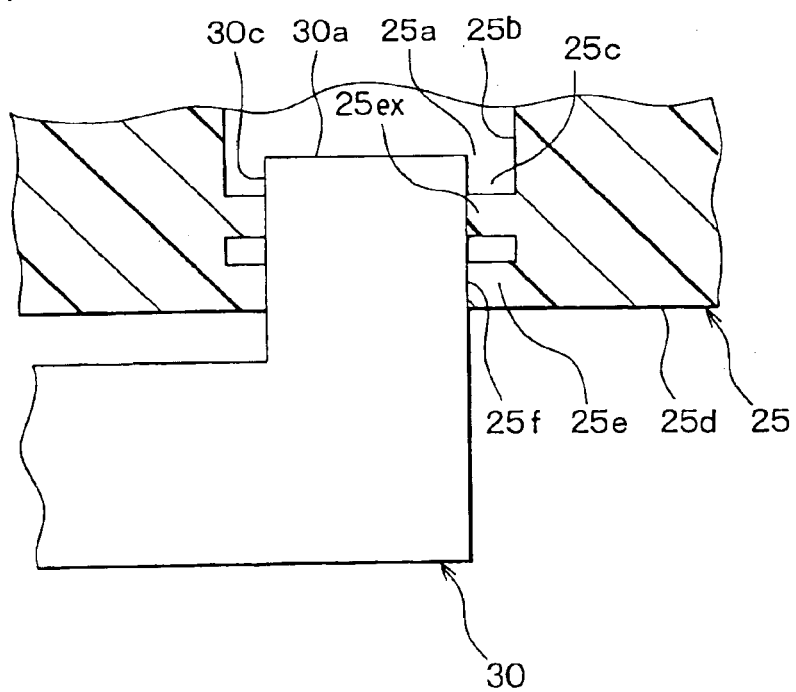
FIG. 7 is an enlarged cross sectional view showing another modification of the connection between the air discharge duct of the blower unit and the hole of the cushion member according to the third embodiment.

In the above instances, the damping flange 25e is the only damping flange provided in the through hole 25a. However, it should be understood that more than one damping flange can be arranged along the inner peripheral surface 25b of the through hole 25a in the axial direction in addition to or in place of the damping flange 25e. For instance, as shown in FIG. 7, another damping flange 25ex can be provided above the damping flange 25e in the cushion member 25. With this arrangement, leakage of the air blown by the first blower unit 13 can be further effectively restrained.

According to the third embodiment, the damping flange(s) 25e, 25ex is formed integrally with the cushion member 25, so that there is no need to provide a separate buffering member for restraining conduction of vibrations of the first blower unit 13 to the cushion member 25. This allows effective damping of the vibrations of the first blower unit 13 with a simpler structure. Furthermore, the damping flange(s) 25e, 25ex can be adhered to the outer peripheral surface 30c of the duct 30 by adhesive, if desired. In this way, leakage of air between the damping flange(s) 25e, 25ex and the duct 30 can be further restrained.

(Fourth Embodiment)

Figure 8:
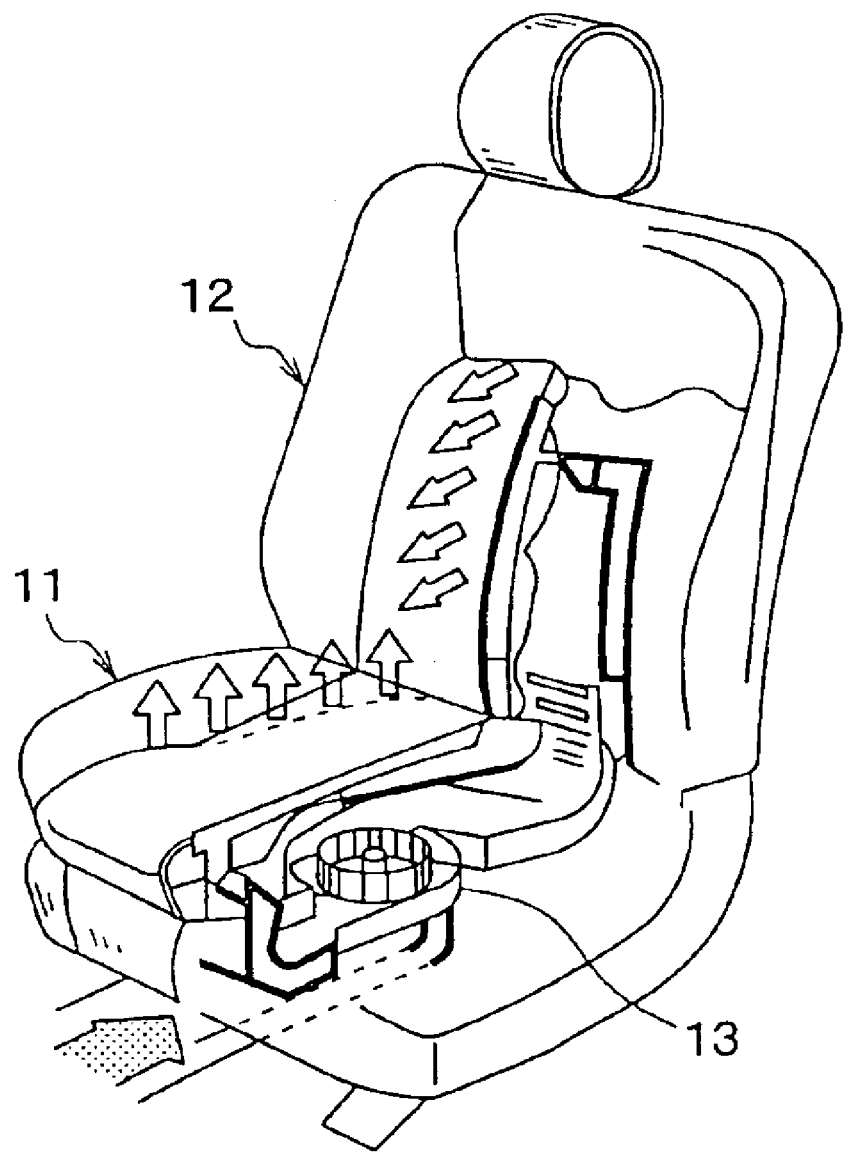
FIG. 8 is a schematic perspective view showing a vehicle seat air conditioning system according to a fourth embodiment of the present invention.

In the first to third embodiments, the present invention is applied to the vehicle seat 10, which includes the blower units 13, 14 installed in the seat cushion arrangement 11 and the seat back arrangement 12, respectively. According to a fourth embodiment of the present invention, as shown in FIG. 8, the second blower unit 14 is eliminated from the seat back arrangement 12. That is, the blower unit 13 is provided only in the cushion arrangement 11 to blow air to both the seat cushion arrangement 11 and the seat back arrangement 12. Even with this arrangement, advantages similar to those discussed in the first to third embodiments can be achieved.

(Fifth Embodiment)

Figure 9:
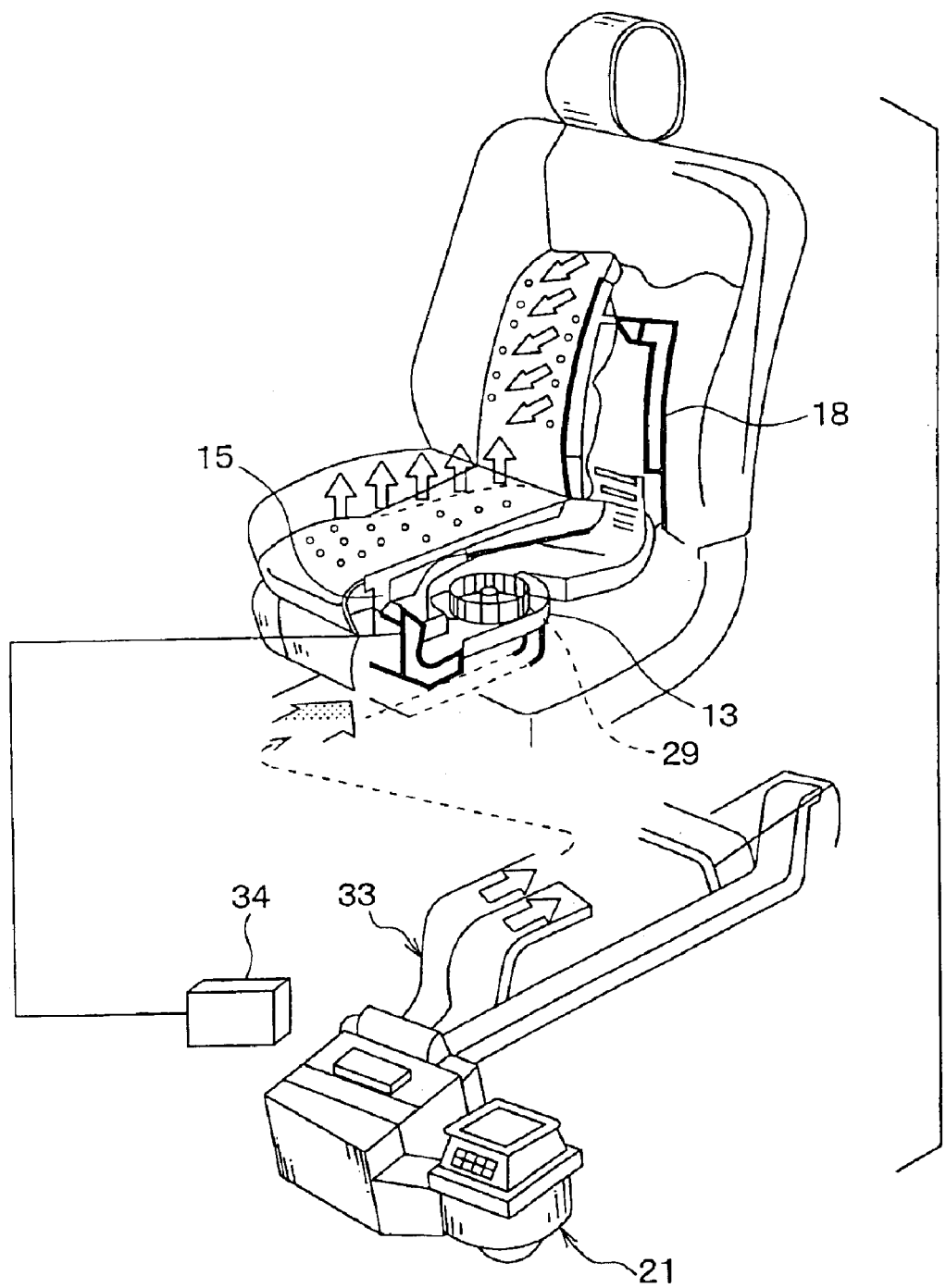
FIG. 9 is a schematic perspective view showing a vehicle seat air conditioning system according to a fifth embodiment of the present invention.

In the first to fourth embodiments, the first blower unit 13 draws the air from the passenger compartment of the vehicle and blows the drawn air to the air passage arrangement 15 provided in the seat 10. According to a fifth embodiment of the present invention, as shown in FIG. 9, the blower unit 13 is provided only in the seat cushion arrangement 11, and the air intake opening 29 of the blower unit 13 is connected to the air outlet opening of the passenger compartment air conditioning unit 21 through an appropriate connector duct 33. In this way, conditioned air (cold air or warm air), which is air conditioned by the passenger compartment air conditioning unit 21, is directly drawn into the first blower unit 13 and is then discharged to the air passage arrangements 15, 18. In this embodiment, the passenger compartment air conditioning unit 21 and the first blower unit 13 are controlled through a control panel 34.

(Sixth Embodiment)

A vehicle seat air conditioning system according to a sixth embodiment of the present invention will be described with reference to FIGS. 10 to 15. A basic structure of the seat 10 according to the sixth embodiment is similar to the structure of the seat 10 discussed with reference to FIG. 1 and thus will not be described further.

First, a specific structure of the first blower unit 13 according to the present embodiment will be described.

Figure 13:
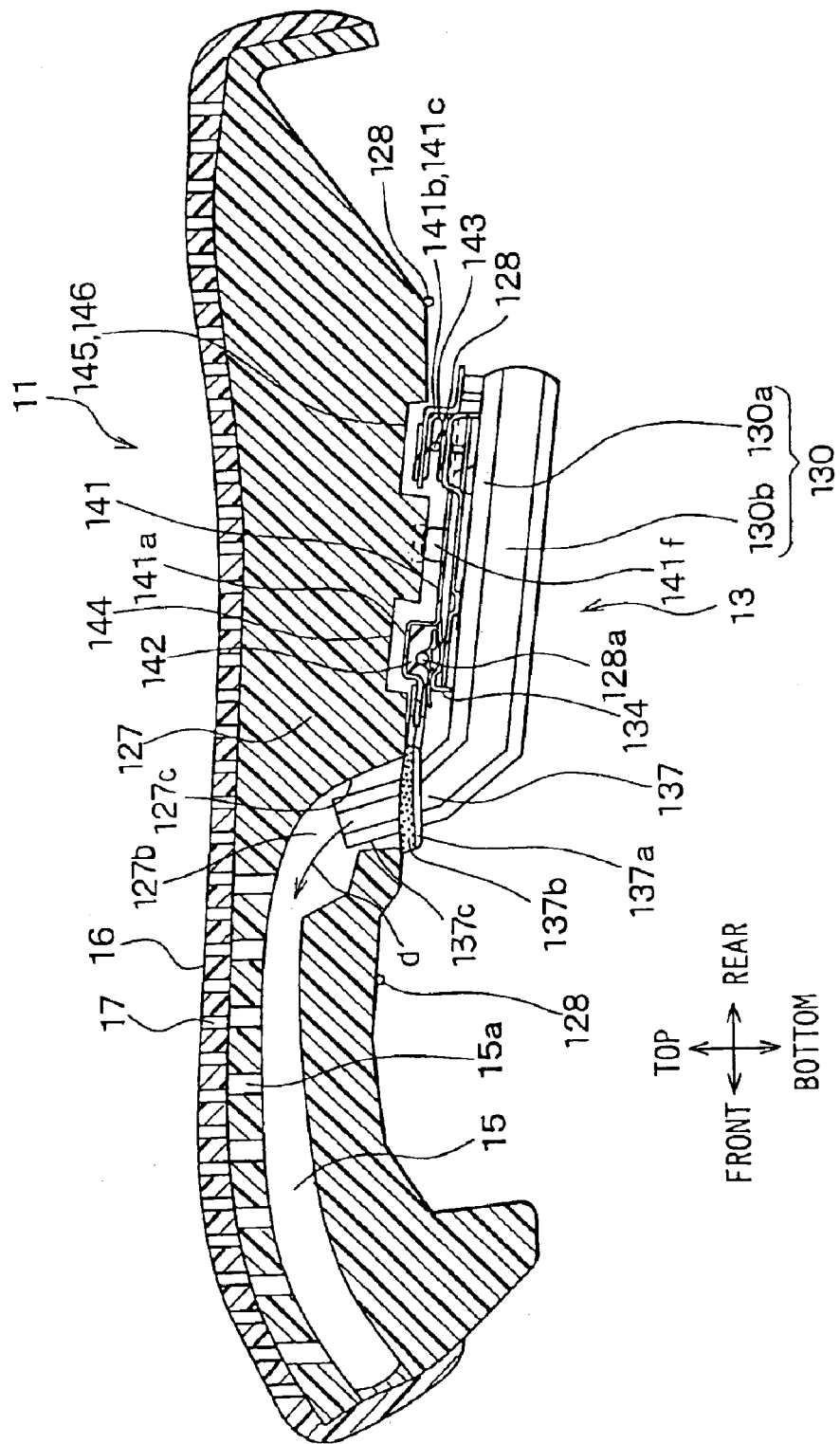
FIG. 13 is a schematic cross sectional view showing the blower unit of FIG. 10, the seat spring members and the seat cushion member.

With reference to FIG. 13, the seat cushion arrangement 11 includes a cushion member 127 provided on a backside (lower side) of the surface cover member 16. Seat spring members 128, 128a are arranged on a backside (lower side) of the cushion member 127. The surface cover member 16 is normally made of a leather or fabric material for the sake of good appearance.

The cushion member 127 is made of a resiliently deformable material, such as a resilient resin material (e.g., open cell type polyurethane foam). A thickness of the cushion member 127 is greater than a thickness of the surface cover member 16 and is sufficient to provide comfortable cushioning.

Figure 12:
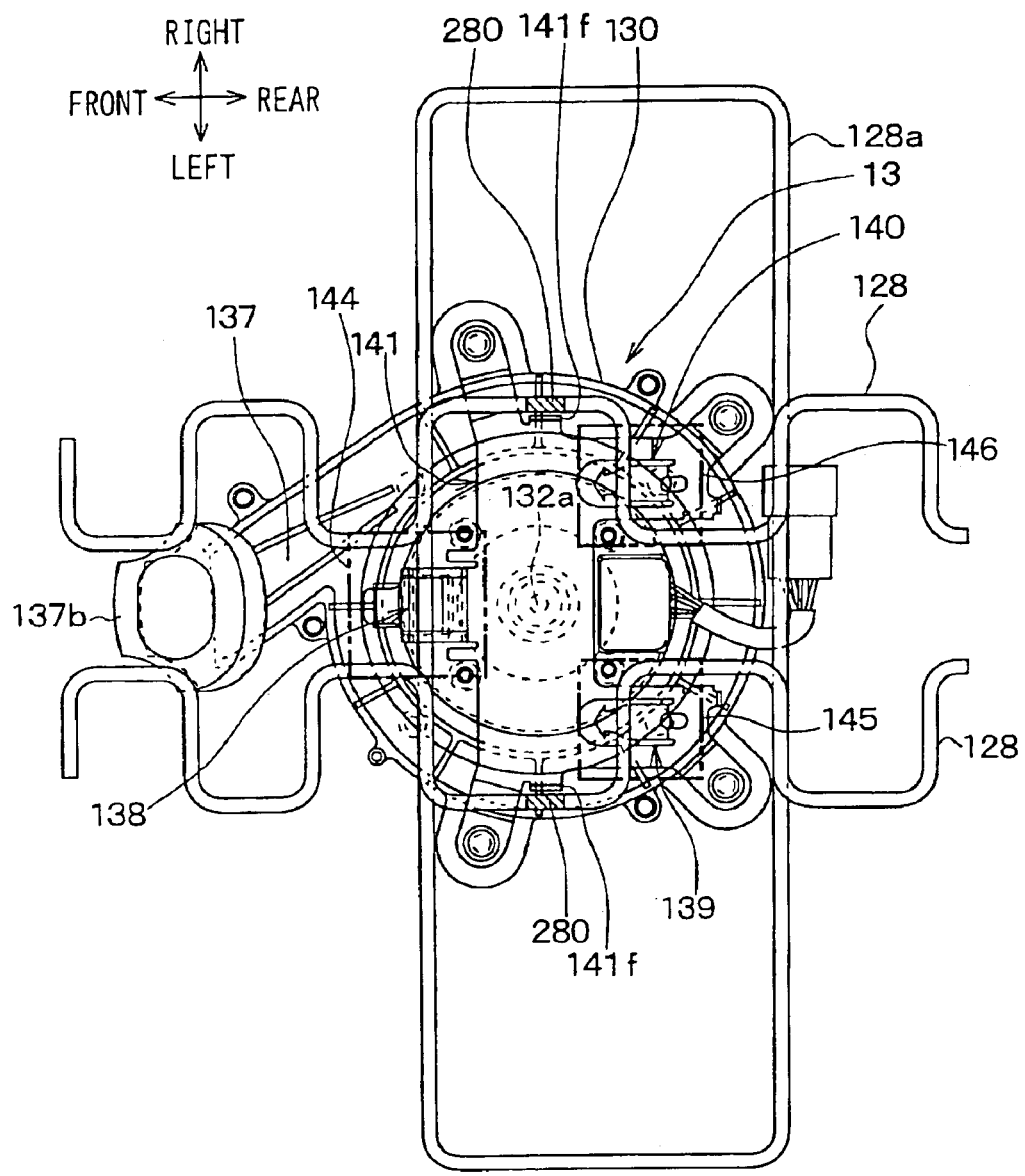
FIG. 12 is a schematic plan view showing arrangement of the blower unit of FIG. 10, seat spring members and recesses of a seat cushion member of the vehicle seat air conditioning system.

Each seat spring member 128, 128a is a wire member, which is made of spring steel and has a circular cross section. Furthermore, each seat spring member 128, 128a is placed below the cushion member 127 in a manner shown in FIG. 12. More specifically, in the present embodiment, the seat spring members 128 are arranged to form repeated S-shaped curves in the fore-aft direction of the vehicle. In FIG. 12, although only two of the seat spring members 128 are depicted, two additional seat spring members (not shown), which are similar to the seat spring members 128, are actually present on the left and right sides, respectively, of the depicted seat spring members 128. Thus, the four seat spring members 128 are present in the seat cushion arrangement 11.

The seat spring member 128a is arranged in a center part of the seat spring members 128, which is centered in the fore-aft direction of the vehicle. The seat spring member 128a forms a generally rectangular closed loop-, which is elongated in the left-right direction of the vehicle. A portion of the seat spring member 128a is overlapped with corresponding sections of the seat spring members 128, which extend in the left-right direction of the vehicle. In each overlapped portion between the corresponding one of the seat spring members 128 and the seat spring member 128a, the seat spring member 128a is joined with the corresponding seat spring member 128 by, for example, crimping.

As described above, the seat spring member 128a is overlapped to and joined to the center portion of the seat spring members 128, so that a spring constant (N/cm) can be increased by the combination of the seat spring members 128 and the seat spring member 128a. In this way, it is possible to restrain excessive deformation and spread of the seat spring members 128 in the left-right direction of the vehicle upon application of the weight of the occupant.

The opposed ends of the seat spring members 128, which are opposed in the fore-aft direction of the vehicle, are connected to and are supported by a seat cushion frame (not shown). The seat cushion frame is made of a rigid metal material and is arranged as a frame body on the backside (lower side) of the cushion member 127. The seat cushion frame functions as a reinforcing member (skeletal member) for maintaining the shape of the seat cushion arrangement 11. Thus, the cushion member 127 can be resiliently supported by the seat spring members 128, 128a in a manner that allows bending or displacement of the cushion member 127.

Figure 10:
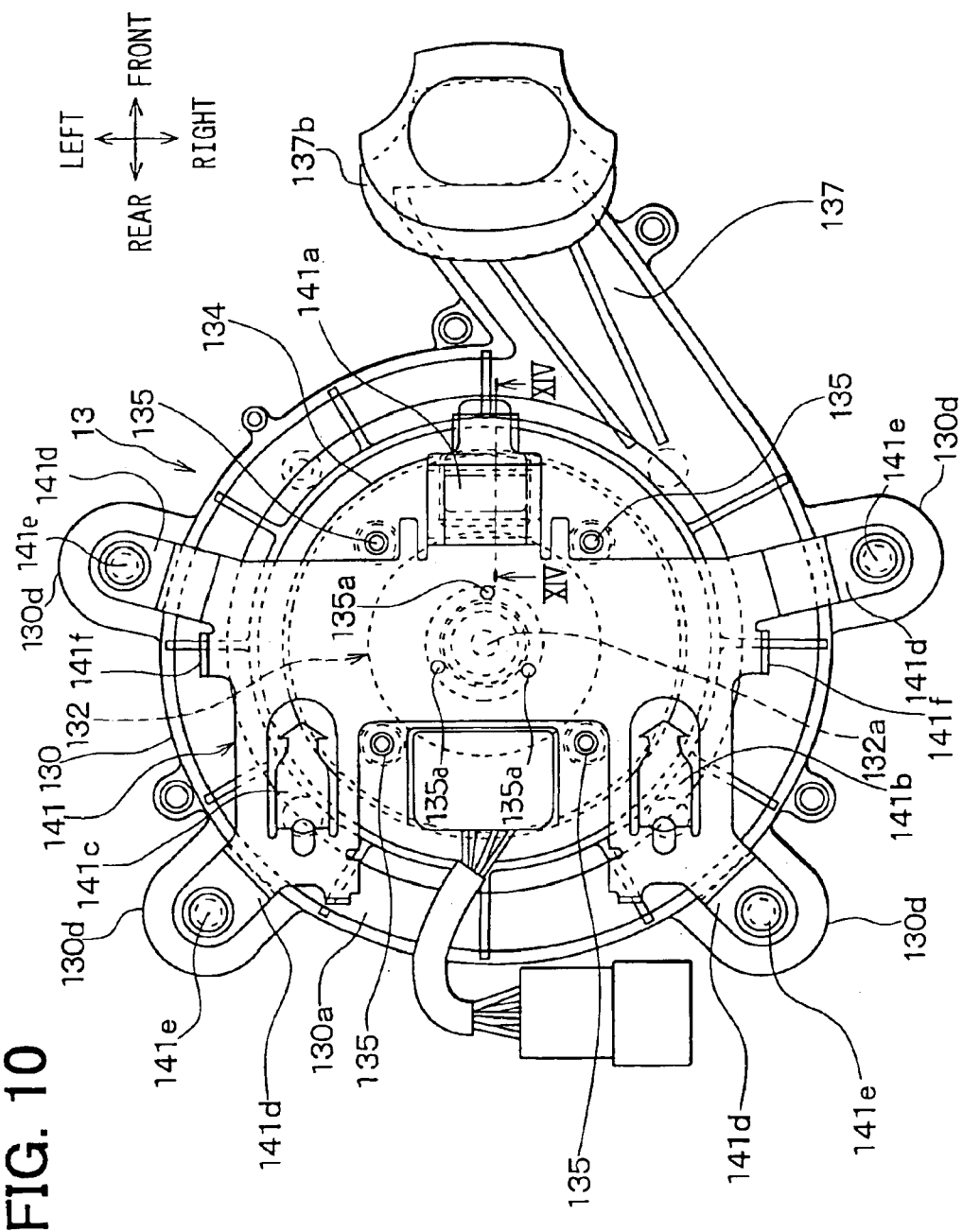
FIG. 10 is an enlarged plan view of a blower unit of a vehicle seat air conditioning system according to a sixth embodiment.
Figure 11:
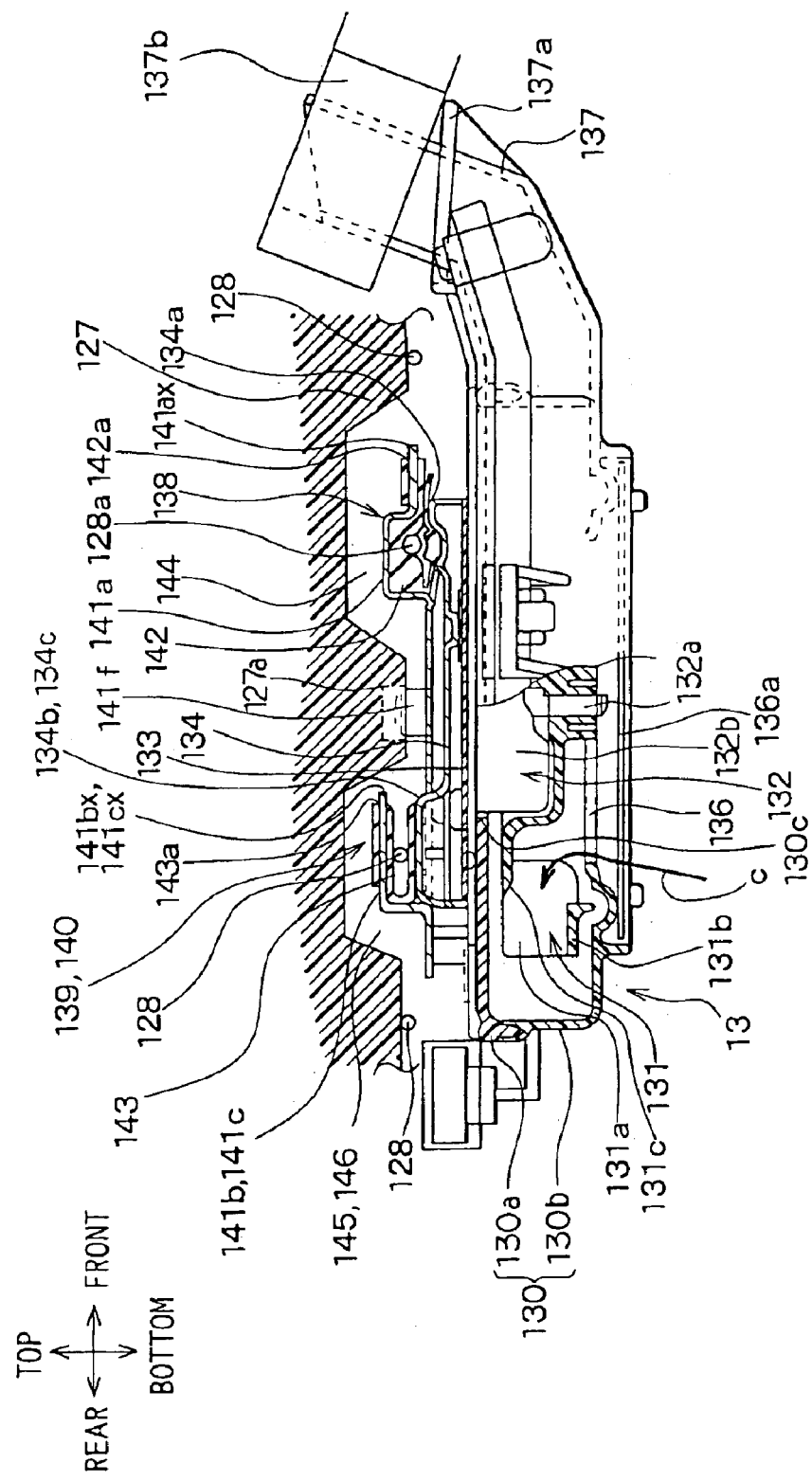
FIG. 11 is a partial cross sectional view showing the blower unit of FIG. 10.

As shown in FIG. 11, a blower casing 130 of the first blower unit 13 includes an upper casing par 130a and a lower casing part 130b, which are independently molded from a resin material. The upper casing part 130a and the lower casing part 130b are joined together by, for example, screwing. As shown in FIG. 10, the blower casing 130 is a scroll casing, which rotatably receives a centrifugal blower fan 131 (FIG. 11).

The centrifugal blower fan 131 includes a plurality of blades 131a, which are arranged at generally equal intervals in a circumferential direction. An air intake opening side (lower side in FIG. 11) of each blade 131a is connected by an annular shroud 131b. The other side of each blade 131a is integrally connected by a circular support plate 131c, which extends radially inward.

The blades 131a, the shroud 131b and the support plate 131c of the centrifugal blower fan 131 are integrally molded from a resin material. A central hole of the support plate 131c securely receives a rotatable shaft 132a of a drive motor 132 in an integrally rotatable manner.

The drive motor 132 is an outer rotor type flat brushless motor. More specifically, in the drive motor 132, a stator (not shown), which includes stator coils, is centered. Furthermore, a rotor 132b, which includes magnets, is arranged radially outward of the stator in a rotatable manner. The rotatable shaft 132a is integrally secured to the rotor 132b.

As shown in FIG. 11, a control circuit board 133 is arranged on a top surface of the upper casing part 130a. The control circuit board 133 includes a generally circular plate board, which is made of a dielectric material, such as a resin material. The board is provided with circuit components, which form a control circuit for controlling operation of the drive motor 132.

A circular opening 130c is provided in the center of the upper casing part 130a, and the rotor 132b and the stator of the motor 132 are received in the opening 130c. With this arrangement, the motor 132 is directly arranged below the control circuit board 133, and the stator coils of the stator are electrically connected to the control circuit of the control circuit board 133.

A cover member (serving as a blower unit side securing member) 134 is arranged above the control circuit board 133. The cover member 134 formed like a circular dish (FIG. 10), which is made from metal (e.g., iron, aluminum) in press working and covers the top surface of the circular control circuit board 133. The cover member 134 is securely screwed to the upper casing part 130a at screw fastening portions 135 (the number of the screw fastening portions 135 is four in this instance) shown in FIG. 10.

The stator centered in the motor 132 is securely screwed to the center of the cover 134 together with the control circuit board 133 at screw fastening portions 135a (the number of the screw fastening portions 135 is three in this instance). In this way, the centrifugal fan 131 and the drive motor 132 are supported by and are secured to the upper casing part 130a through the control circuit board 133 and the cover member 134.

The circular air intake opening 136 (FIG. 11) is opened in the center of a base of the lower casing part 130b. The air intake opening 136 is communicated with a space near a floor of the passenger compartment located below the seat cushion arrangement 11. A filter member 136a is arranged in the air intake opening 136 to remove dust particles located near the floor of the passenger compartment. The filter member 136a is made of, for example, a stainless mesh member.

A terminal end of a scroll passage of the blower casing 130 is an air discharge outlet, which is oriented toward the front end of the vehicle, as shown in FIG. 10. An air discharge duct 137 is provided in the air discharge outlet. As shown in FIGS. 11 and 13, the air discharge duct 137 is integrally molded together with the upper and lower casing parts 130a, 130b in such a manner that the air discharge duct 137 extends obliquely upward from the air discharge outlet.

The air passage arrangement 15 (FIG. 1), which extends in the fore-aft direction of the vehicle as shown in FIG. 13, is formed in the cushion member 127. A front end of the air discharge duct 137 is inserted into an inlet (also referred to as an air intake passage section) 127b of the air passage arrangement 15. A predetermined space is provided between the outer peripheral surface 137c of the air discharge duct 137 and an inner wall surface 127c of the inlet 127b of the air passage arrangement 15 to avoid direct contact of the front end of the air discharge duct 137 with the inner wall surface 127c of the inlet 127b of the air passage arrangement 15.

A packing support portion (or simply referred to as a support portion) 137a (FIGS. 11 and 13) projects radially outward in the middle of the length of the air discharge duct 137. As shown in FIG. 13, a packing (also referred to as a buffering member) 137b is supported by the packing support portion 137a and is resiliently compressed between the packing support portion 137a and a wall surface of the cushion member 127 located around a peripheral edge of the opening of the inlet 127b, so that air leakage at the inlet 127b of the air passage arrangement 15 is restrained. The packing 137b is formed as an annular body, which is fitted to the outer peripheral surface of the air discharge duct 137 via a resilient sealing material, such as a resin foam material. Furthermore, the packing 137b can securely adhere to at least one of the packing support portion 137a and the cushion member 127 by adhesive.

A plurality of communication openings 15a is formed in a portion of the cushion member 127, which is bound to the air passage arrangement 15, to communicate between the air passage arrangement 15 and the surface cover member 16. The air in the air passage arrangement 15 is conducted to the air discharge openings 17 of the surface cover member 16 through the communication openings 15a. In this way, the communication openings 15a can serve as part of the air passage arrangement 15.

Next, a structure for mounting the first blower unit 13 to the seat spring members 128, 128a will be described in greater detail. In the present embodiment, as shown in FIG. 12, first to third support arrangements 138–140 are provided on the top surface of the blower casing 130. The first support arrangement 138 is arranged on one side of the rotatable shaft 132a of the motor 132, which is centered in the first blower unit 13. More specifically, the first support arrangement 138 is arranged on a vehicle front end side of the rotatable shaft 132a. The second and third support arrangements 139, 140 are symmetrically arranged in the left-right direction of the vehicle on the other side of the rotatable shaft 132a of the motor 132, i.e., on a vehicle rear end side of the rotatable shaft 132a of the motor 132.

Figure 14:
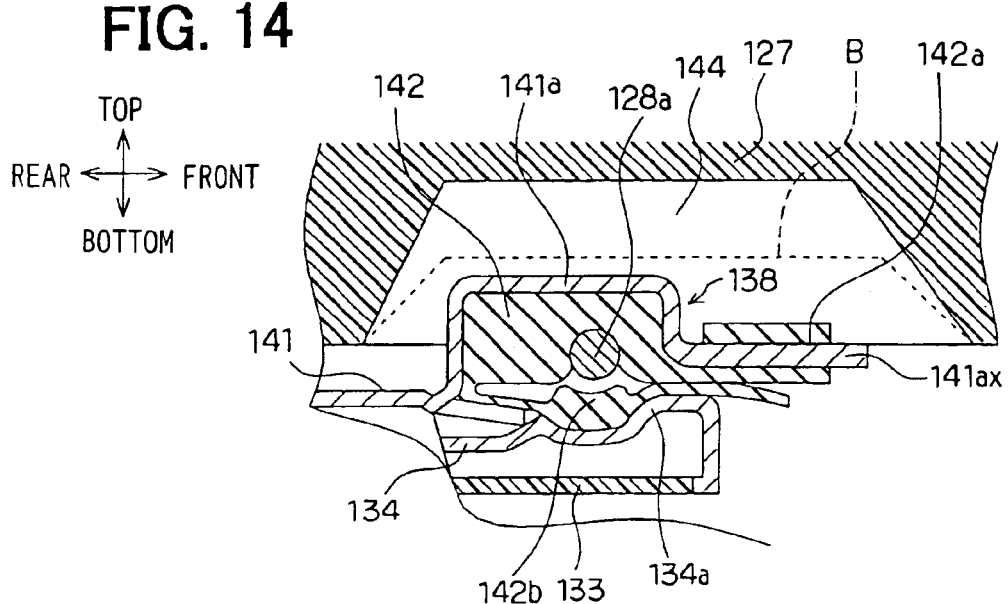
FIG. 14 is an enlarged cross sectional view along line XIV—XIV in FIG. 10.

Base portions 134a–134c (FIGS. 11 and 14), which protrude upwardly, are integrally formed by press working in the top surface of the cover member 134 at positions, which correspond to the first to third support arrangements 138–140. As shown in FIG. 14, the base portion 134a, which is arranged in the first support arrangement 138, is formed as a protrusion, which has an arcuate recess that corresponds to a circular cross-section of the corresponding seat spring member 128a. Contrary to this, as shown in FIG. 11, each of the base portions 134b, 134c, which are arranged in the second and third support arrangements 139, 140, respectively, is formed as a gate shaped protrusion having a flat top surface.

The first to third support arrangements 138–140 are made from a combination of the cover member 134 and the connector bracket 141, which is arranged above the cover member 134. The cover member 134 and the blower casing 130 are placed below the seat spring members 128, 128a, i.e., are arranged on one side of the seat spring members 128, 128a, which is opposite from the cushion member 127.

Figure 15:
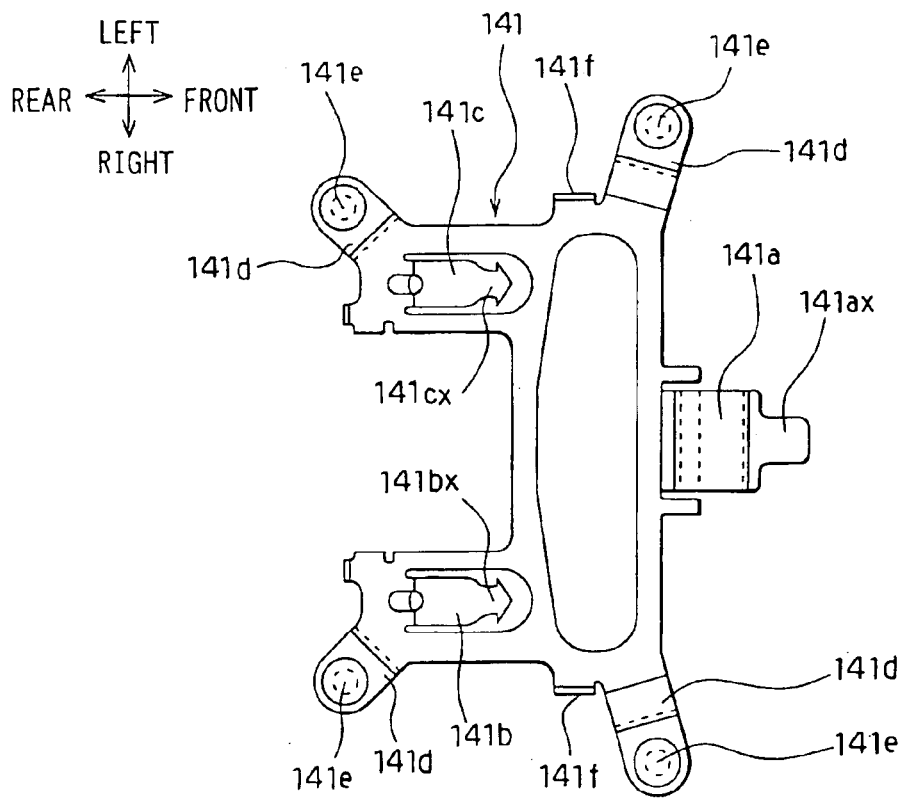
FIG. 15 is a plan view of a connector bracket of the vehicle seat air conditioning system of the sixth embodiment.

The connector bracket 141 is arranged above the seat springs 128, 128a, i.e., is arranged on the other side of the seat spring members 128, 128a, at which the cushion member 127 is arranged. The connector bracket 141 is a plate-like member, which is made upon press working of metal, such as iron metal or an aluminum alloy. FIG. 15 shows a plan view of the connector bracket 141.

The connector bracket 141 includes spring holding protrusions 141a–141c. Each spring holding protrusion 141a–141c is integrated in the connector bracket 141 and projects upwardly as a cranked protrusion at a position that corresponds to the corresponding base portion 134a–134c. Furthermore, four joint legs 141d are provided in an outer peripheral edge of the connector bracket 141. Screw fastening portions 141e are provided in the joint legs 141d. The joint legs 141d are securely screwed to joint legs 130d of the upper and lower casing parts 130a, 130b of the blower casing 130 by the screw fastening portions 141e.

Furthermore, stopper pieces 141f are provided in opposed edges of the connector bracket 141, which are arranged on the left and right vehicle sides of the connector bracket 141, such that the stopper pieces 141f are bent and project upwardly toward the cushion member 127. As shown in FIG. 12, the stopper pieces 141f are opposed to each other and are positioned adjacent the inner portions of the left and right seat spring members 128, respectively.

When external force is applied to the connector bracket 141 and thus to the entire blower unit 13 in the left-right direction of the vehicle, the stopper pieces 141f engage the seat spring members 128 to limit positional deviation of the blower unit 13.

Resilient damper members (vibration limiting members) 280; made of, for example, felt are installed to the opposed portions (shaded portions in FIG. 12) of the corresponding seat spring members 128, which are opposed to the corresponding stopper pieces 141. Thus, when external force, which could induce positional deviation of the blower unit 13, is applied to the blower unit 13, it is possible to prevent direct contact between the stopper pieces 141f and the seat spring members 128. It should be understood that the resilient damper members 280 can be alternatively installed to the stopper pieces 141f in place of the seat spring members 128.

Recesses 127a (FIG. 11), which receive distal ends (top ends) of the stopper pieces 141f, are formed in the lower surface of the cushion member 127. A size of each recess 127a is set such that the corresponding stopper piece 141f is received in the recess 127a, and a predetermined space is left between the cushion member 127 and the stopper piece 141f to limit direct contact between the stopper pieces 141f and the cushion member 127.

Among the spring holding protrusions 141a–141c of the connector bracket 141, the spring holding protrusion 141a, which corresponds to the base portion 134a, has a horizontal top flat surface, as shown in FIGS. 11, 14 and 15. An engaging portion 141ax extends from a front end of the top flat surface of the spring holding protrusion 141a such that the engaging portion 141ax is stepped down from the top flat surface of the spring holding protrusion 141a and has a width smaller than a width of the rest of the spring holding protrusion 141a.

On the other hand, each of the spring holding protrusions 141b, 141c, which correspond to the base portions 134b, 134c, respectively, includes a top flat surface that extends horizontally, as shown in FIGS. 11 and 15. An engaging portion 141bx, 141cx, which has a reduced width, is provided in a front end of the top flat surface of the spring holding protrusion 141b, 141c.

A resilient damper member 142 (FIGS. 11 and 14) is placed between the base portion 134a of the cover member 134 and the spring holding protrusion 141a of the connector bracket 141 such that the seat spring member 128a is held between the base portion 134a and the spring holding protrusion 141a via the resilient damper member 142.

Similarly, resilient damper members 143 (FIG. 11) are provided as follows. That is, each of resilient damper members 143 (FIG. 11) is placed between the base portion 134b, 134c of the cover member 134 and the spring holding protrusion 141b, 141c of the connector bracket 141 such that the seat spring member 128 is held between the base portion 134b, 134c and the spring holding protrusion 141b, 141c via the resilient damper member 143. In FIG. 11, although only one of the second and third support arrangements 139, 140 is depicted, the second and third support arrangements 139, 140 have substantially the same structure, and the resilient damper members 143 have substantially the same shape and are made of the same material.

Each of the resilient damper members 142, 143 performs vibration damping action that restrains conduction of vibrations, which are generated upon rotation of the blower fan 131 of the blower unit 13, to the cushion member 127 through the seat spring members 128, 128a. Thus, a spring constant of each of the resilient damper members 142, 143 is set to a predetermined value that allows effective vibration damping action of the resilient damper members 142, 143 at vibration frequencies of the blower fan 131 side. Furthermore, the resilient damper members 142, 143 absorb or tolerate effect of distortion of the seat spring members 128, 128a to limit vibrations of the blower unit 13 caused by the distortion of the seat spring members 128, 128a.

A preferred material of the resilient damper members 142, 143 is a rubber material (e.g., an ethylene-propylene terpolymer rubber, i.e., EPDM rubber) or a plate shaped felt material, which includes resilient fibers.

Each of the resilient damper members 142, 143 is generally plate shaped and includes a connection hole 142a, 143a. The connection hole 142a, 143a extends through one end (i.e., one end of the resilient member 142, 143 located on a vehicle front end side) of the resilient damper member 142, 143 in the fore-aft direction of the vehicle. In the resilient damper member 142, the connection hole 142a receives the front engaging portion 141ax of the spring holding protrusion 141a, and thus the corresponding end of the resilient damper member 142 is securely engaged to the spring holding protrusion 141a.

As shown in FIG. 14, the resilient damper member 142 is bent into a U-shape and is placed between an inner surface (lower side surface) of the spring holding protrusion 141a and a top surface of the base portion 134a of the cover member 134 such that the resilient damper member 142 surrounds the seat spring member 128a. A spring receiving portion 142b, which has a thick body, is formed in a portion of the resilient damper member 142 that is located below the seat spring member 128a in opposed relationship to the seat spring member 128a.

A load is applied to a portion of the resilient damper member 142, which is held between the spring holding protrusion 141a and the seat spring member 128a, in a compression direction of the resilient damper member 142 compressed by the weight of the blower unit 13. Thus, the portion of the resilient damper member 142, which is held between the spring holding protrusion 141a and the seat spring member 128a, is resiliently compressed. Thus, a small space is formed between the seat spring member 128a and the spring receiving portion 142b located below the seat spring member 128a.

Similarly, in each resilient damper member 143, the connection hole 143a receives the engaging portion 141bx, 141cx of the spring holding protrusion 141b, 141c, and the corresponding end of the resilient damper member 143 is securely engaged to the spring holding protrusion 141b, 141c. Furthermore, similar to the resilient damper member 142, each resilient damper member 143 is bent into a U-shape and is placed between an inner surface (lower side surface) of the spring holding protrusion 141b, 141c and a top surface of the base portion 134b, 134c of the cover member 134, as shown in FIG. 11.

Unlike the resilient damper member 142, the opposed surfaces of each resilient damper member 143, which are disposed on opposite sides of the seat spring member 128 and are opposed to each other generally in the vertical direction, are flat along the spring holding protrusion 141b, 141c and the base portion 134b, 134c, respectively. This allows slide movement of the seat spring member 128 in the fore-aft direction of the vehicle (the left-right direction in FIG. 11). That is, each resilient damper member 143 does not entirely surround the seat spring member 128. Instead, each resilient damper member 143 forms spaces on the vehicle front end side and the vehicle back end side of the seat spring member 128.

Similar to the resilient damper member 142, in each resilient damper member 143, a load is applied to a portion of the resilient damper member 143 in a compression direction of the resilient damper member 143 compressed by the weight of the blower unit 13. Thus, a lower portion of the resilient damper member 143 located below the spring holding protrusion 141b, 141c is resiliently compressed. As a result, a small space (not shown) is formed between the seat spring member 128 and a portion of the resilient damper member 143 located above the base portion 134b, 134c.

Recesses 144–146 are formed in the back surface (lower surface) the cushion member 127 at positions that correspond to the spring holding protrusions 141a–141c of the connector bracket 141. In FIG. 12, the recesses 144–146 are indicated by dot-dot-dash lines. Each recess 144-146 is formed to receive the corresponding spring holding protrusion 141a–141c in such a manner that a predetermined space is left between the recess 144–146 and the spring holding protrusion 141a–141c.

More specifically, a horizontal size of each recess 144-146 is larger than a horizontal size of the corresponding protrusion 141a–141c by a predetermined amount, which is determined upon consideration of a manufacturing and assembling size tolerance of each corresponding component. Furthermore, a depth (vertical size) of each recess 144–146 is set such that a base surface of the recess 144–146 does not contact with a top surface of the corresponding protrusion 141a–141c even when the cushion member 127 is resiliently deformed in the downward direction by the weight of the occupant seated in the seat 10.

FIG. 14 indicates positional shift of the base surface of the cushion member 127 from a position indicated by a solid line where no occupant is seated in the seat 10 to a position indicated by a dotted line B where the occupant is seated in the seat 10. The depth of the recess 144 is set to prevent contact of the base surface of the recess 144 with the top surface of the protrusion 141a even at the position indicated by the dotted line B.

Next, advantages of the present embodiment will be described. The first blower unit 13 and the cushion member 127 are arranged on the opposite sides of the seat spring members 128, 128a, and the connector bracket 141 is provided on the cushion member 127 side of the seat spring members 128, 128a. The seat spring members 128, 128a are held between the connector bracket 141 and the cover member 134, which is secured to the blower casing 130 of the first blower unit 13, through the resilient damper members 142, 143.

In this way, the first blower unit 13 is supported by the seat spring members 128, 128a in such a manner that the entire first blower unit 13 is suspended by the seat spring members 128, 128a. Thus, the first blower unit 13, which is considered as a rigid component, is arranged inside the cushion member 127, and therefore the first blower unit 13 does not cause uncomfortable feeling of the occupant seated in the seat 10. In other words, the occupant may not feel the presence of the first blower unit 13. Furthermore, the first blower unit 13 is supported by the seat spring members 128, 128a, so that the first blower unit 13 can be displaced upon resilient deformation of the seat spring members 128, 128a at the time of presence of the occupant in the seat 10. As a result, mechanical shocks are not applied to the first blower unit 13 when the occupant is seated in the seat 10. Thus, failure of the first blower unit 13 caused by such mechanical shocks can be prevented.

Transmission of vibrations, which are generated by rotation of the first blower unit 13, to the cushion member 127 through the seat spring members 128, 128a can be effectively limited. That is, the recesses 144–146 are formed in the cushion member 127 in such a manner that the spring holding protrusions 141a–141c are spaced a predetermined distance from the cushion member 127. Thus, even in the case where the spring holding protrusions 141a–141c of the bracket 141 project toward the cushion member 127, the spring holding protrusions 141a–141c do not engage the cushion member 127 and thus are not pushed downward by the cushion member 127 when the occupant is seated in the seat 10.

As a result, it is possible to avoid occurrence of compression of the resilient damper members 142, 143 induced by the urging force, which is applied from the cushion member 127 and causes an increase in the spring constant of the resilient damper members 142, 143. Therefore, the spring constant of the resilient damper members 142, 143 can be maintained within a range suitable for achieving effective vibration damping action of the resilient damper members 142, 143. Furthermore, since the entire connector bracket 141 is spaced from the cushion member 127, vibrations of the first blower unit 13 are not directly conducted to the cushion member 127 through the connector bracket 141.

When the air discharge duct 137 is inserted into the inlet of the air passage arrangement 15 of the cushion member 127, the predetermined space is provided between the outer peripheral surface of the air discharge duct 137 and the inner wall surface of the inlet of the air passage arrangement 15 to avoid direct contact of the front end of the air discharge duct 137 with the inner wall surface of the inlet of the air passage arrangement 15. Thus, vibrations of the first blower unit 13 are not directly conducted from the discharge duct 137 to the cushion member 127.

Furthermore, the seat spring members 128 can slide in the fore-aft direction of the vehicle (left-right direction in FIG. 11) with respect to the resilient damper members 143, and effect of distortion of the seat spring members 128, 128a can be absorbed or tolerated by the resilient deformation of the resilient damper members 142, 143. As a result, vibrations of the first blower unit 13 induced by the distortion of the seat spring members 128, 128a can be limited.

Vibration damping action of each resilient damper member 142, 143 mainly takes place in the upper part of the resilient damper member 142, 143, which is held between the spring holding protrusion 141a–141c of the connector bracket 141 and the seat spring member 128, 128a. However, when the first blower unit 13 is vertically vibrated due to, for example, vibrations of the vehicle, the lower part of the resilient damper member 142, 143, which is held between the seat spring member 128, 128a and the base portion 134a–134c of the cover member 134, also damps the vibrations. At the same time, the lower part of the resilient damper member 142, 143 limits generation of hitting sound, which could be generated between the metal seat spring members 128, 128a and the cover member 134 upon engagement therebetween.

(Seventh Embodiment)

Figure 16:
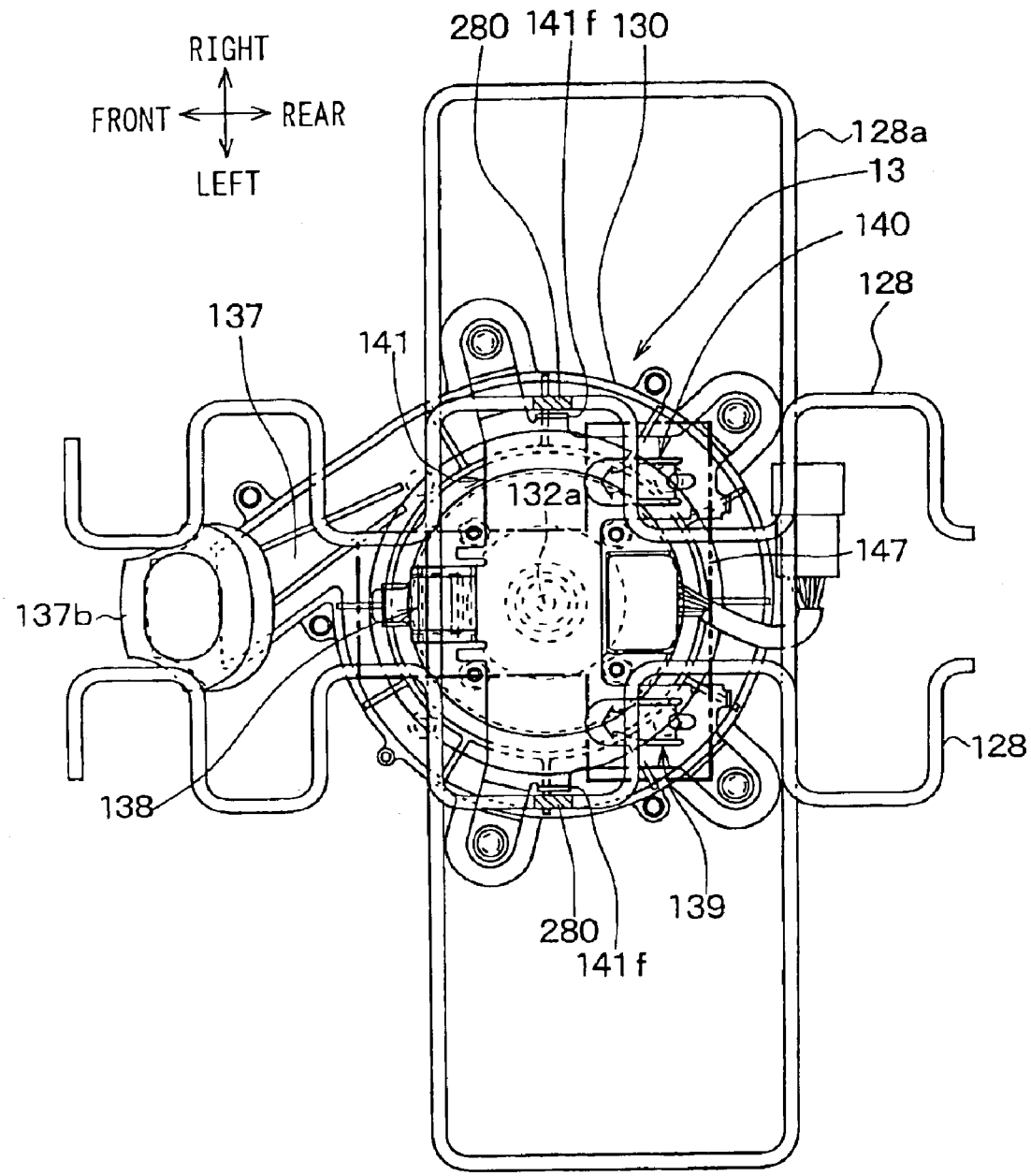
FIG. 16 is a schematic plan view showing an arrangement of a blower unit, seat spring members and a recess of a seat cushion member of a vehicle seat air conditioning system according to a seventh embodiment.

In the sixth embodiment, the recesses 144–146 are formed in the cushion member 127 at the three locations, which correspond to the three spring holding protrusions 141a–141c of the connector bracket 141. In a seventh embodiment, as shown in FIG. 16, a single recess 147, which receives all of the three spring holding protrusions 141a–141c of the connector bracket 141, is formed in the cushion member 127. Even with this arrangement, advantages similar to those of the sixth embodiment can be achieved.

(Modifications)

In the first to third embodiments, the vehicle seat air conditioning system of the present invention is applied to the seat cushion arrangement 11. However, it should be understood that the seat air conditioning system of the present invention is equally applicable to the seat back arrangement 12.

Furthermore, in the first to fifth embodiments, the present invention is applied to the vehicle seat 10, in which air is discharged from the surface cover member 16 through the air passage arrangement 15 upon rotation of the first blower unit 13. Alternatively, the present invention can be applied to a vehicle seat 10, which draws air from the surface cover member 16.

Furthermore, in the first to seventh embodiments, the first blower unit 13 is supported by the seat spring members 31, 128, 128a made from the wire. Alternatively, an appropriate rigid component can be provided below the cushion member 25, and the first blower unit 13 can be held by the rigid component.

In the sixth and seventh embodiments, the seat spring members 128, 128a are held between the connector bracket 141 and the cover member 134, which covers the top of the control circuit board 133. However, in a case where the control circuit board 133 and the cover member 134 are not provided in the top surface of the upper casing part 130a of the blower casing 130, the seat spring members 128, 128a can be held between the upper casing 130a of the blower casing 130 and the connector bracket 141. Thus, in this case, the upper casing part 130a of the blower casing 130 constitutes "a blower unit side securing member" of the present invention.

Furthermore, in the sixth and seventh embodiments, both the first and second blower units 13, 14 draw the air inside the passenger compartment and discharge the drawn air to the air passage arrangements 15, 18 provided inside the seat 10. However, the inlets of the first and second blower units 13, 14 can be connected to the air outlet of the passenger compartment air conditioning unit 21 through an appropriate connection duct. Then, the conditioning air (cold air, warm air), which has been temperature adjusted in the passenger compartment air conditioning unit 21, is drawn into the first and second blower units 13, 14 and is then discharged into the air passage arrangements 15, 18 provided inside the seat.

Furthermore, in the sixth and seventh embodiments, the mounting structure of the first blower unit 13 mounted to the seat cushion arrangement 11 is described. The mounting structure of the first blower unit 13 is equally applicable to the mounting structure of the second blower unit 14 mounted to the seat back arrangement 12.

Additional advantages and modifications will readily occur to those skilled in the art. The invention in its broader terms is therefore not limited to the specific details, representative apparatus, and illustrative examples shown and described.

What is claimed is:

1. A vehicle seat air conditioning system comprising:

a cushion member that provides cushioning to an occupant seated on the cushion member and includes an air passage arrangement that extends in the cushion member, wherein the air passage arrangement includes an air intake passage section at an inlet of the air passage arrangement;

a blower unit that is arranged outside the cushion member to blow air and includes an air discharge duct at an air outlet of the blower unit, wherein the air discharge duct is connected to the air intake passage section of the cushion member to supply blown air from the blower unit to the air intake passage section; and a buffering member that is connected between the cushion member and the air discharge duct to damp vibrations of the blower unit and thus to limit conduction of the vibrations from the blower unit to the cushion member, wherein the buffering member is directly connected to the air intake passage section of the cushion member and is formed separately from the air discharge duct.

2. The vehicle seat air conditioning system according to claim 1, wherein the buffering member is made of a material, which has relatively low air permeability.

3. The vehicle seat air conditioning system according to claim 1, wherein:
the air discharge duct includes a support portion, which protrudes radially outward and is arranged at a position that is spaced a predetermined distance from a distal end surface of the air discharge duct; and
the buffering member is arranged between an end surface of the cushion member, which is located on a blower unit side of the cushion member, and an end surface of the support portion, which is located on a cushion member side of the support portion.

4. The vehicle seat air conditioning system according to claim 1, wherein the buffering member is securely adhered to at least one of the cushion member and the air discharge duct.

5. The vehicle seat air conditioning system according to claim 1, further comprising:
at least one seat spring member that is arranged between the cushion member and the blower unit and is connected to the cushion member and the blower unit; and
at least one resilient damper member, wherein every connection between the blower unit and the at least one seat spring member is provided with at least one of the at least one resilient damper member in such a manner that the resilient damper member is inserted in the connection to damp vibrations transmitted from the blower unit to the at least one seat spring member.

6. The vehicle seat air conditioning system according to claim 1, wherein the buffering member is made of a material, which is different from a material of the air discharge duct.

7. The vehicle seat air conditioning system according to claim 1, wherein:
the air discharge duct is formed integrally with a blower casing of the blower unit, which rotatably receives a blower fan; and
the buffering member is directly connected to the air discharge duct.

8. The vehicle seat air conditioning system according to claim 1, wherein the buffering member is formed as an annular body, which is fitted to an outer peripheral surface of the air discharge duct.

9. A vehicle seat air conditioning system comprising:
a cushion member that provides cushioning to an occupant seated on the cushion member and includes an air passage arrangement that extends in the cushion member, wherein the air passage arrangement includes an air intake passage section at an inlet of the air passage arrangement;
a blower unit that is arranged outside the cushion member to blow air and includes an air discharge duct at an air outlet of the blower unit, wherein the air discharge duct is connected to the air intake passage section of the cushion member to supply blown air from the blower unit to the air intake passage section; and
a buffering member that is connected between the cushion member and the air discharge duct to damp vibrations of the blower unit and thus to limit conduction of the vibrations from the blower unit to the cushion member, wherein at least a portion of an outer peripheral surface of the air discharge duct is received in the air intake passage section such that a space is provided between at least the portion of the outer peripheral surface of the air discharge duct and a passage wall of the air intake passage section.

10. A vehicle seat air conditioning system comprising:
a cushion member that provides cushioning to an occupant seated on the cushion member and includes an air passage arrangement that extends in the cushion member, wherein the air passage arrangement includes an air intake passage section at an inlet of the air passage arrangement;
a blower unit that is arranged outside the cushion member to blow air and includes an air discharge duct at an air outlet of the blower unit, wherein the air discharge duct is connected to the air intake passage section of the cushion member to supply blown air from the blower unit to the air intake passage section;
a buffering member that is connected between the cushion member and the air discharge duct to damp vibrations of the blower unit and thus to limit conduction of the vibrations from the blower unit to the cushion member;
a surface cover member that includes a plurality of air discharge openings communicated with the air passage arrangement and is arranged on one side of the cushion member, which is opposite from the blower unit;
at least one seat spring member that is arranged between the cushion member and the blower unit and resiliently supports the cushion member;
a connector bracket that is positioned between the cushion member and the at least one seat spring member and is secured to the blower unit;
a blower unit side securing member that is secured to the blower unit; and
at least one resilient damper member that is held between the connector bracket and the blower unit side securing member and holds the at least one seat spring member, so that the blower unit is resiliently supported by the at least one seat spring member through the at least one resilient damper member, wherein the connector bracket includes at least one protrusion, which protrudes toward the cushion member and holds the at least one seat spring member through the at least one resilient damper member, and the cushion member includes at least one recess, which receives the at least one protrusion of the connector bracket in such a manner that the at least one protrusion is spaced from the cushion member.

11. The vehicle seat air conditioning system according to claim 10, wherein:
the at least one protrusion of the connector bracket includes a plurality of protrusions; and
the at least one recess of the cushion member includes a plurality of recesses, which receives a corresponding one of the protrusions of the connector bracket.

12. The vehicle seat air conditioning system according to claim 10, wherein:
the at least one protrusion of the connector bracket includes a plurality of protrusions; and
the at least one recess includes a single recess, which receives all the protrusions of the connector bracket.

13. The vehicle seat air conditioning system according to claim 10, wherein the blower unit includes:
a blower fan;
a motor that drives the blower fan;
a blower casing that rotatably receives the blower fan; and
a control circuit that controls the motor and is arranged outside the blower casing, wherein the control circuit is covered with a cover member, and the blower unit side securing member is the cover member.

14. The vehicle seat air conditioning system according to claim 10, wherein the air discharge duct is integrally formed in the blower casing.

15. A vehicle seat air conditioning system comprising:
a cushion member that provides cushioning to an occupant seated on the cushion member and includes an air passage arrangement that extends in the cushion member, wherein the air passage arrangement includes an air intake passage section at an inlet of the air passage arrangement;
a blower unit that is arranged outside the cushion member to blow air and includes an air discharge duct at an air outlet of the blower unit, wherein the air discharge duct is directly connected to the air intake passage section of the cushion member to supply blown air from the blower unit directly to the air intake passage section; and
a buffering member that is connected between the cushion member and the air discharge duct to damp vibrations of the blower unit and thus to limit conduction of the vibrations from the blower unit to the cushion member.

16. A vehicle seat air conditioning system comprising:
a cushion member that provides cushioning to an occupant seated on the cushion member and includes an air passage arrangement that extends in the cushion member, wherein the air passage arrangement includes an air intake passage section at an inlet of the air passage arrangement;
a blower unit that is arranged outside the cushion member to blow air and includes an air discharge duct at an air outlet of the blower unit, wherein the air discharge duct extends into the air intake passage section of the cushion member to supply blown air from the blower unit to the air intake passage section; and
a buffering member that is connected between the cushion member and the air discharge duct to damp vibrations of the blower unit and thus to limit conduction of the vibrations from the blower unit to the cushion member.

* * * * *